May 16, 1939.  C. E. K. MEES  2,158,883

PHOTOGRAPHIC EMULSION CONTAINING SUPERSENSITIZED-4'-CARBOCYANINES

Filed March 29, 1937

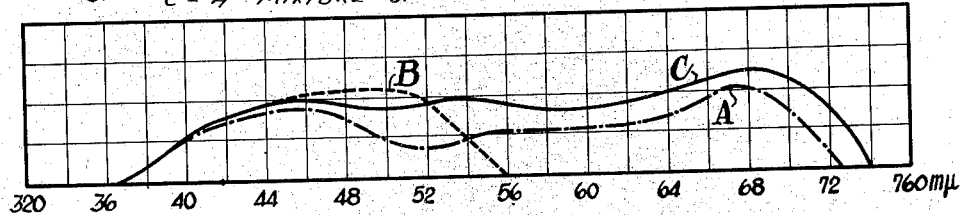

Fig. 1.
A = 2,1'-DIETHYLTHIA-4'-CARBOCYANINE IODIDE
B = 2,1'-DIETHYL-6'-METHYLTHIA-4'-CYANINE IODIDE
C = A MIXTURE OF THESE TWO DYES

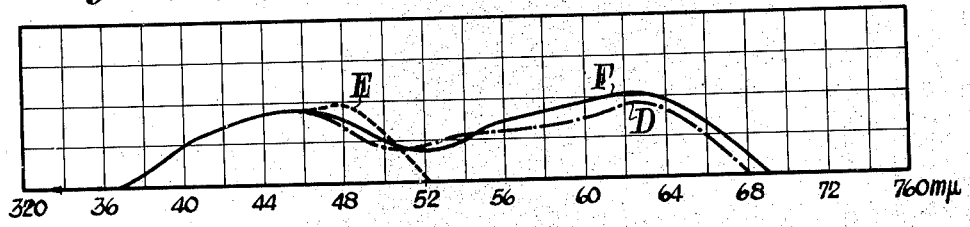

Fig. 2.
D = 2,1'-DIETHYLOXA-4'-CARBOCYANINE IODIDE
E = 3,1'-DIETHYL-4-PHENYLOXAZOLO-2'-CYANINE IODIDE
F = A MIXTURE OF THESE TWO DYES

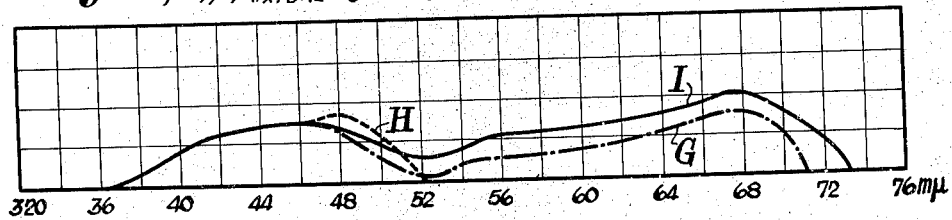

Fig. 3.
G = 2,1'-DIETHYLTHIA-4'-CARBOCYANINE IODIDE
H = 3,1'-DIETHYL-4-PHENYLOXAZOLO-2'-CYANINE IODIDE
I = A MIXTURE OF THESE TWO DYES

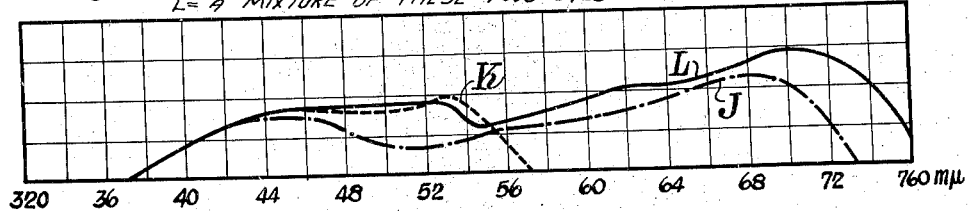

Fig. 4.
J = 2,1'-DIETHYL-6'-DIMETHYLAMINOSELENA-4'-CARBOCYANINE IODIDE
K = 2,1'-DIETHYLTHIA-2'-CYANINE IODIDE
L = A MIXTURE OF THESE TWO DYES

Charles E. K. Mees,
INVENTOR.

BY N. M. Perrins
Daniel J. Mayne
ATTORNEYS.

Patented May 16, 1939

2,158,883

UNITED STATES PATENT OFFICE 2,158,883

PHOTOGRAPHIC EMULSION CONTAINING SUPERSENSITIZED-4'-CARBOCYANINES

Charles E. K. Mees, Rochester, N. Y., assignor to Eastman Kodak Company, Rochester, N. Y., a corporation of New Jersey Application March 29, 1937, Serial No. 133,583

14 Claims. (Cl. 95—7)

This invention relates to sensitized photographic emulsions and more particularly to photographic emulsions, such as those of the gelatino-silver-halide type, containing a mixture or combination of two or more sensitizing materials, at least one of which cooperates with at least one other to alter the sensitivity of the emulsion to a greater degree than is possible with any one of the sensitizing materials alone. The sensitization produced by my combinations is always greater, in some spectral region, than the sum total of the sensitizations produced by the separate sensitizing materials. The sensitizing materials of my combinations are substances generally referred to as dyes and more particularly as dyes of the cyanine class.

It is known in the art of making photographic emulsions that certain dyes of the cyanine class alter the sensitivity of photographic emulsions of the gelatino-silver-halide type, when incorporated therein. The sensitizing effect produced by the dyes does not increase proportionally to the amount of dye, but passes through a maximum as the concentration is increased. Within the range of concentration most useful in practice, the sensitivity increases much more slowly than the concentration of the dye. Likewise, the combined effect of two or more dyes on an emulsion is rarely equivalent to the sum of their separate effects; in general it is much less. Most commonly, the combined effect is no greater than the effect of a single one of the dyes employed in a concentration equal to the sum of the concentrations of all the dyes in the combination. Very frequently, the combined effect of two dyes is less than that of one of them alone.

I have found that certain mixtures or combinations of two or more cyanine dyes, that the sensitization is substantially greater, in some spectral region, than that of any one of the dyes in the absence of the other or others. I will call this phenomenon supersensitization. In general, at least one dye of my combination may be said to be supersensitized by the other or others. The dye which is supersensitized may be called the basic sensitizer and the other dye the supersensitizer. However, the effect may be mutual and the dyes indistinguishable from the standpoint of which is supersensitized.

Supersensitization is a specific phenomenon and is found only in mixtures or combinations of dyes from certain groups. In the instant application, this phenomenon generally takes the form of an increase in the sensitization produced by one or more dyes for the red end of the spectrum, upon the admixture of one or more dyes which in themselves are sensitizers for only shorter wavelengths. The magnitude of supersensitization depends upon the relative and absolute concentrations of the dyes in the emulsion and the type of the emulsion. In the instant application, the supersensitizing effects have been clearly demonstrated under suitable conditions which are applicable to commercial practice.

This application deals with emulsions containing supersensitizing mixtures or combinations of one or more unsymmetrical 4'-carbocyanines containing an azole nucleus of the oxygen group with one or more 2'-cyanines, i. e. pseudocyanines, or one or more 4'-cyanines, i. e. isocyanines. Just how the dyes of my mixtures cooperate to give a supersensitizing effect is not known. I shall refer to the mixtures as combinations, although I do not intend to imply that the dyes are chemically combined.

Unlike the carbocyanines described in my copending application Serial No. 120,966, filed January 16, 1937, the 4'-carbocyanine dyes of the instant application show supersensitizing effects when the trimethenyl chain is devoid of substituents as well as when the trimethenyl chain carries alkyl groups on any of the three carbon atoms.

An object of my instant invention, therefore, is to provide photographic emulsions containing supersensitizing combinations of cyanine dyes. A further object is to provide a process for sensitizing photographic emulsions with supersensitizing combinations of dyes and to provide a method of increasing the red sensitivity of emulsions sensitized to the red region of the spectrum. A still further object is to provide a photographic element comprising a support coated with such supersensitized emulsions. Other more specific objects will become apparent hereinafter.

The dyes which I employ in my supersensitizing combinations are sensitizers of photographic emulsions when incorporated therein alone. While there is more than one manner of formulating and naming the dyes which I employ in practicing my invention, it is believed that the formulas, systems of nomenclature and names used herein are in accordance with those used during the development of the cyanine dye art to its present stage. The most probable formulas of representative dye-types are given below in order to clearly set forth the nature of the materials employed in my supersensitizing mixtures. These formulas should not be construed as limiting my invention.

Among the 4'-carbocyanine dyes useful in practicing my invention are the following:

The oxa-4'-carbocyanine dyes which can be represented by the following general formula:

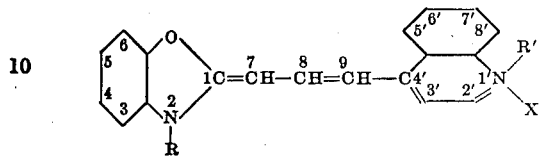

The 3,4-benzoxa-4'-carbocyanine dyes which can be represented by the following general formula:

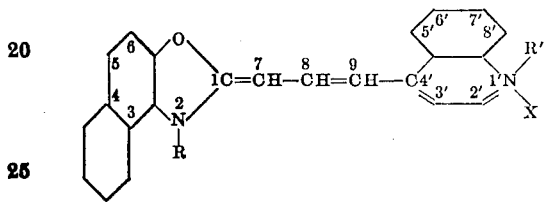

The 5,6-benzoxa-4'-carbocyanine dyes which can be represented by the following general formula:

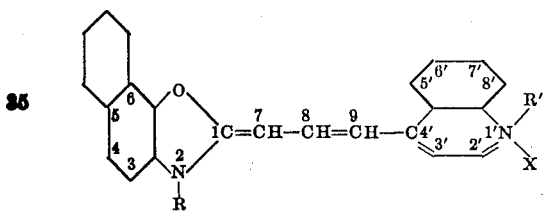

The thia-4'-carbocyanine dyes which can be represented by the following general formula:

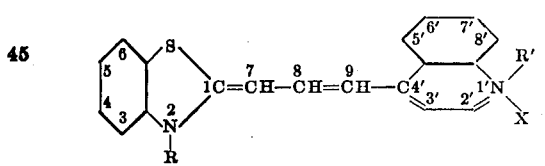

The 3,4-benzothia-4'-carbocyanine dyes which can be represented by the following general formula:

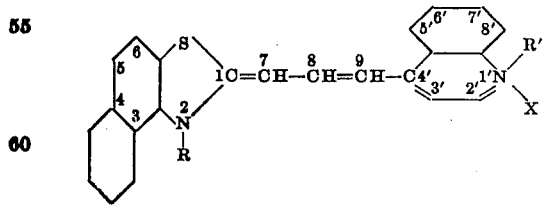

The selena-4'-carbocyanine dyes which can be represented by the following general formula:

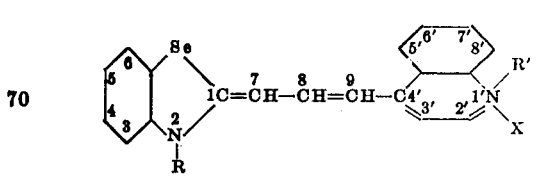

In general the 4'-carbocyanine dyes of my supersensitizing combinations can be represented by the following composite formula:

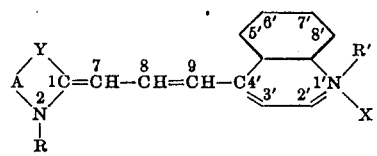

wherein A represents a divalent aryl group, such as a phenylene or a naphthylene group and Y represents a divalent non-metallic atom, such as oxygen, sulfur or selenium. All of these 4'-carbocyanine dyes contain a quinoline nucleus and an azole nucleus of the oxygen group, e. g. arylo-azole nuclei, such as benzoxazole, naphthoxazole, benzothiazole, naphthothiazole and benzoselenazole.

In all of the above formulas, R and R' represent alkyl groups and X represents an acid radical. I have found it convenient to employ carbocyanine dye-iodides (where X represents iodine) in practicing my invention. However, other dye-salts, such as the chlorides, bromides, perchlorates, alkylsulfates or alkyl-p-toluenesulfonates can be employed, for example. I have found it advantageous to employ dyes wherein R and R' represent alkyl groups of two to four carbon atoms, such as ethyl, butyl, isobutyl, β-hydroxyethyl or allyl for example. I have further found the dyes wherein R and R' represent ethyl groups to be especially useful. The nuclei of the dyes can carry simple substituents which do not interfere with sensitizing properties, such as alkyl, alkoxyl, chloro or amino groups for example. The trimethenyl chain can carry alkyl group substituents.

The 4'-carbocyanines can be prepared by reacting a 4-(β-anilinovinyl)-quinoline quaternary salt with an azole quaternary salt containing a reactive alkyl group, i. e. a reactive methyl group, in the alpha position. Alternatively the unsymmetrical 4'-carbocyanines can be prepared by reacting an azole quaternary contain a β-acetanilidovinyl group in the alpha position with a lepidine quaternary salt. The following examples are illustrative of the preparation of these dyes. These examples are not intended to limit my invention.

*Example 1.—1',2-diethyloxa-4'-carbocyanine iodide*

2.17 g. (1 mol.) of 1-(β-acetanilidovinyl)-benzoxazole ethiodide, 1.5 g. (1 mol.) of lepidine ethiodide and 0.8 g. (2 mol.) of anhydrous sodium acetate were heated to refluxing in 20 cc. of absolute ethyl alcohol for about 30 minutes. The dye separated from the cooled reaction mixture. The crude dye was stirred with 25 cc. of warm water filtered and washed with warm water. The dye was thrice recrystallized from methyl alcohol and obtained as blue-green needles melting at 262° to 264° C. with decomposition.

*Example 2.—1',2-diethylthia-4'-carbocyanine iodide*

2.25 g. (1 mol.) of 1-(β-acetanilidovinyl)-benzothiazole ethiodide, 1.5 g. (1 mol.) of lepidine ethiodide and 0.8 g. (2 mol.) of anhydrous sodium acetate were heated to refluxing in 25 cc. of absolute ethyl alcohol for about 30 minutes. The dye separated from the chilled reaction mixture. The crude dye was washed with acetone and treated with hot water as in the preceding example. The crude dye was recrystallized several times from methyl alcohol and obtained as green needles melting at 271° to 273° C. with decomposition.

*Example 3.—1',2-diethylselena-4'-carbocyanine iodide*

2.0 g. (1 mol.) of 4-(β-anilinovinyl)-quinoline ethiodide, 1.76 g. (1 mol.) of 1-methylbenzoselenazole ethiodide were heated to refluxing in 20 cc. of dry pyridine for about 10 minutes. The dye separated from the cooled reaction mixture. The crude dye was washed with acetone and recrystallized from methyl alcohol. The dye was as green crystals melting at 258° to 260° C. with decomposition.

The 4-(β-anilinovinyl)-quinoline ethiodide was prepared by heating an intimate mixture of 29.9 g. (1 mol.) of lepidine ethiodide and 19.6 g. (1 mol.) of diphenylformamidine at 150° to 160° C. for about 10 minutes, with stirring. The reaction mixture was allowed to cool and was then ground with acetone. The acetone-treated product was recrystallized from methyl alcohol and obtained as red crystals with a blue reflex melting at 248° to 250° C. with decomposition.

*Example 4.—1',2-diethyl-3,4-benzothia-4'-carbocyanine iodide*

1 g. (1 mol.) of 2-methyl-β-naphthothiazole ethiodide, 2 g. (1 mol. plus 100% excess) of 4-(β-anilinovinyl)-quinoline ethiodide and 20 cc. of dry pyridine were heated to refluxing for about 15 minutes. The dye separated from the cooled reaction mixture and was washed with acetone. The crude dye was twice recrystallized from methyl alcohol and obtained as dark green crystals melting at 243° to 245° C. with decomposition.

*Example 5.—1',2-diethyl-5,6-benzothia-4'-carbocyanine iodide*

1.8 g. (1 mol.) of 1-methyl-α-naphthothiazole ethiodide, 2.0 g. (1 mol.) of 4-(β-anilinovinyl)-quinoline ethiodide and 20 cc. of dry pyridine were heated to refluxing for about 10 minutes. The dye separated from the cooled reaction mixture and was successively washed with water and acetone. The crude washed dye was recrystallized from methyl alcohol and obtained as dark green crystals melting at 261° to 263° C. with decomposition.

1'2-diethyl-3,4-benzoxa-4'-carbocyanine iodide and 1,2-diethyl-5,6-benzoxa-4'-carbocyanine iodide were made by heating one molecular proportion of 4-(β-anilinovinyl) quinoline ethiodide with 2-methyl-β-naphthoxazole ethiodide and 1-methyl-α-naphthoxazole ethiodide respectively in dry pyridine as in the above example. The dyes were recrystallized from methyl alcohol. The 3,4-dye was obtained as dark green crystals melting at 276° to 277° C. with decomposition. The 5,6-dye was obtained as green crystals melting at 269° to 270° C. with decomposition.

The 1-(β-acetanilidovinyl)-benzoxazole and benzothiazole quaternary salts can be prepared as illustrated in the following examples:

67 g. (1 mol.) of 1-methylbenzothiazole ethiodide and 48 g. (1 mol.) of diphenylformamidine and 365 cc. of acetic anhydride were refluxed for about 20 minutes. The reaction product separated from the chilled reaction mixture.

58 g. (1 mol.) of 1-methylbenzoxazole ethiodide and 40 g. (1 mol.) of diphenylformamidine and 250 cc. of acetic anhydride were refluxed for about 20 minutes. The reaction product separated from the chilled reaction mixture.

Among the pseudocyanine dyes which can be employed in practicing my invention are the following:

The 2,2'-cyanine dyes which can be represented by the following general formula:

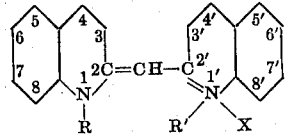

The thia-2'-cyanine dyes which can be represented by the following general formula:

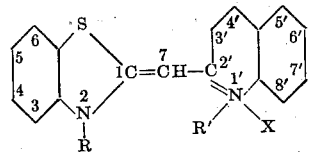

The selena-2'-cyanine dyes which can be represented by the following general formula:

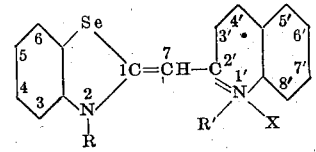

The 3,4-benzothia-2'-cyanine dyes which can be represented by the following general formula:

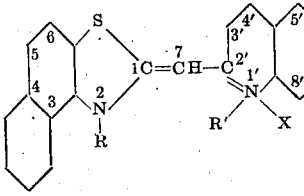

The 3,4-benzothia-2'-cyanine dyes which can be represented by the following general formula:

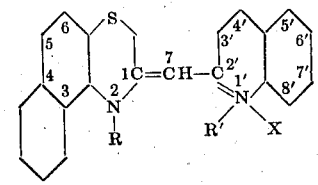

The 5,6-benzothia-2'-cyanine dyes which can be represented by the following general formula:

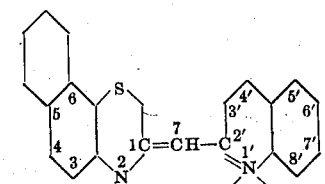

The 5,6-benzo-2,2'-cyanine dyes which can be represented by the following general formula:

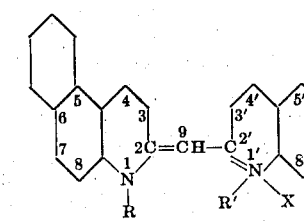

The 4,5 (3,2-acenaphtho) thiazolo-2'-cyanine dyes which can be represented by the following general formula:

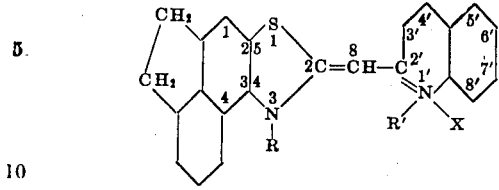

The oxazolo-2'-cyanine dyes which can be represented by the following general formula:

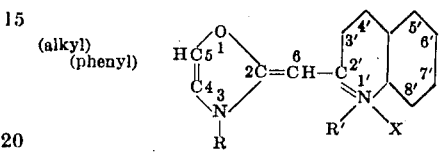

Among the isocyanines which can be employed in practicing my invention are the following:

The oxa-4'-cyanines which can be represented by the following general formula:

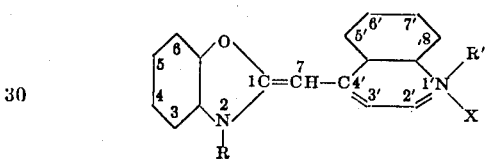

The thia-4'-cyanines which can be represented by the following general formula:

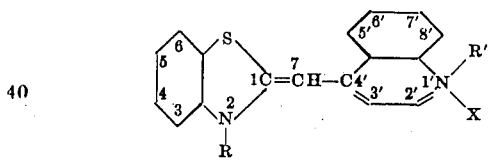

The selena-4'-cyanines which can be represented by the following general formula:

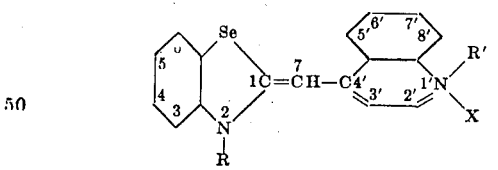

The 3,4-benzothia-4'-cyanines which can be represented by the following general formula:

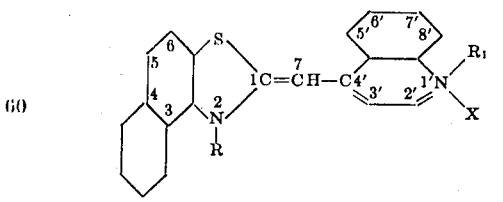

In all of the above formulas of pseudocyanine and isocyanine dyes, R and R' represent alkyl groups and X represents an acid radical. The oxazolo-2'-cyanines can be substituted in the 5-position with substituents, such as alkyl or aryl groups of the benzene series, for example phenyl. In practicing my invention, I have found it convenient to employ the pseudocyanine or isocyanine dye-iodides (wherein X represents iodine). However other pseudocyanine or isocyanine salts can be employed, such for example as the chlorides, bromides, perchlorates, alkylsulfates or alkyl-p-toluene-sulfonates for example. I have further found it advantageous to employ pseudocyanine or isocyanine dyes wherein R and R' represent alkyl groups of from one to four carbon atoms. The dyes wherein R and R' represent ethyl are particularly useful in practicing my invention. The pseudocyanine or isocyanine dyes can be substituted in their nuclei with simple substituents which do not interfere with sensitizing properties, such for example as alkyl, chloro, alkoxy or amino groups.

Brooker and Keyes in the Journal of the American Chemical Society, vol. 57, pages 2488-2491 (1935) have reviewed the literature pertaining to pseudocyanine dyes and describe methods for the preparation thereof. Oxazolo-2'-cyanine dyes are described in U. S. Patent No. 1,969,446.

Isocyanine dyes can be prepared by reacting of cyclammonium quaternary salts having a reactive alkyl group, e. g. a methyl group, with a quinoline quaternary salt, in the presence of an alkali, e. g. sodium ethylate. Thia-4'-cyanine and benzothia-4'-cyanine dyes are described by Brooker & Keyes in the Journal of the American Chemical Society, vol. 59, page 78, 1937. Oxa-4'-cyanines can be prepared by reacting 4-cyanoquinoline quaternary salts with benzoxazole quaternary salts containing a reactive alkyl group according to the method described in British Patent 455,710. Selena-4'-cyanines can be prepared by reacting benzoselenazole quaternary salts having a reactive alkyl group with a quinoline quaternary salt. The following example is illustrative.

3.5 g. (1 mol.) of 1-methylbenzoselenazole ethiodide, 5.7 g. (2 mols.) of quinoline ethiodide were heated to boiling in about 30 cc. of absolute ethyl alcohol. To the boiling mixture were added gradually 1.4 g. (2.1 mols.) of potassium hydroxide (85%) dissolved in 10 cc. of absolute ethyl alcohol. Boiled for about 25 minutes longer. The dye separated from the cooled reaction mixture. Crude dye was boiled with acetone to remove impurities and was finally recrystallized from methyl alcohol. The pure dye was obtained as scarlet needles.

The objects of my invention can be accomplished by merely incorporating one or more sensitizing unsymmetrical 4'-carbocyanine dyes together with one or more sensitizing pseudocyanine or isocyanine dyes capable of supersensitizing the 4'-carbocyanines in a photographic emulsion. My invention is particularly directed to the ordinarily employed gelatino-silver-halide emulsions. However, my supersensitizing combinations can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, for example, silver chloride or silver bromide emulsions which can contain other salts which may be light-sensitive. By way of illustration, the herein described supersensitized emulsions were prepared employing an ordinary gelatino-silver-bromide emulsion of ordinary concentration (approximately 40 g. of silver halide per liter). The dyes were generally employed in concentrations of the order of 10 mg. each, per liter of ordinary emulsion, but can be employed in concentrations several times greater or less than that. The ratio of concentrations of the unsymmetrical 4'-carbocyanine dye to the concentration of pseudocyanine or isocyanine dye may be varied widely from 5:1 to 1:5 for example. The most favorable conditions for supersensitization of the desired magnitude must be determined by experiment, the manner of which will be apparent to those skilled in the art upon a complete perusal of these specifications.

The methods of incorporating dyes in emulsions are simple and well known to those skilled in the art. In practicing my invention, the dyes of my combinations can be added separately or together. It is convenient to add dyes separately in the form of their solutions in appropriate solvents. The solvent must, of course, be compatible with the emulsion, substantially free from any deleterious effect on the light-sensitive materials and capable of dissolving the dyes in practicing my invention. The dyes are advantageously incorporated in the finished, washed emulsion and should be uniformly distributed throughout the emulsion. The emulsion can then be converted into a photographic element by coating upon a support, such as glass, cellulose acetate, cellulose nitrate, other cellulose derivative or resin, in a manner well known in the art.

The following combinations or mixtures of dyes are illustrative of my invention. These illustrations are not intended to be limiting.

| Unsymmetrical 4'-carbocyanines | Pseudocyanines and isocyanines |
| --- | --- |
| 2, 1'-diethyloxa-4'-carbocyanine iodide, with. | 2, 1'-diethylthia-2'-cyanine iodide. |
| Do | 3, 1' - diethyl - 4 - phenyloxazola-2'-cyanine iodide. |
| 2, 1'-diethylthia-4'-carbocyanine iodide, with. | Do. |
| Do | 1, 1'-diethyl-2, 2'-cyanine iodide. |
| Do | 2, 1'-diethyl-3, 4-benzothia-2'-cyanine iodide. |
| Do | 2, 1'-diethyl-6'-methylthia-4'-cyanine iodide. |
| Do | 2, 1'-diethyloxa-4'-cyanine iodide. |
| 2, 1'-diethyl-4'-carbocyanine iodide, with. | 2, 1' - diethyl - selena - 4' - cyanine iodide. |
| 2, 1'-diethylselena-4'-carbocyanine iodide, with. | 3, 1'-diethyl-4-phenyloxazolo-2'-cyanine iodide. |
| 2, 1'-diethyl-6'-dimethyl selena-4'-carbocyanine iodide, with. | 2, 1'-diethylthia-2'-cyanine iodide. |
| 2, 1'-diethyl-3, 4-benzothia-4'-carbocyanine iodide, with. | Do. |

While I have illustrated only combinations containing one unsymmetrical 4'-carbocyanine dye and one pseudocyanine or isocyanine dye, my combinations can as well contain one unsymmetrical 4'-carbocyanines cooperating with two or more penudocyanines or isocyanines or one pseudocyanine and one isocyanine to give a supersensitizing effect. Likewise my combinations can contain one pseudocyanine or one isocyanine cooperating with two 4'-carbocyanines.

Unsymmetrical 4'-carbocyanines, pseudocyanines and isocyanines containing the 5,6-benzothia nucleus are almost generally of lesser utility in practicing my invention. Combinations containing such dyes show smaller, and in many cases, much smaller supersensitizing effects. Among the oxazolo-2'-cyanines, those substituted in the 4-position of the oxazole nucleus by an alkyl group, such as methyl or by an aryl group of the benzene series, such as phenyl, are especially useful in practicing my invention.

In general it can be said of my combinations that the unsymmetrical 4'-carbocyanine is the dye supersensitized (basic sensitizer) and that the pseudocyanine or isocyanine is the supersensitizer. However, the nature of this relationship between the dyes of my combinations is frequently difficult to determine and is, in fact, immaterial to the practice of my invention.

The accompanying drawing is by way of illustration and depicts the supersensitizing effect of four of my new combinations. Each figure of the drawing is a diagrammatic reproduction of three spectrograms showing, first, the sensitivity of a silver bromide emulsion containing an unsymmetrical-4'-carbocyanine dye (represented by the dot and dash line in each figure), second, the sensitivity of the same silver bromide emulsion containing a pseudocyanine or isocyanine dye (represented by the dotted line of each figure), and third, the sensitivity of the same emulsion containing a mixture or combination of the said unsymmetrical 4'-carbocyanine dye with the said pseudocyanine or isocyanine dye (represented by the solid line in each figure). The supersensitizing effect is apparent from the drawing.

In Fig. 1 of the drawing curve A represents the sensitivity of an ordinary gelatino-silver-bromide emulsion containing 2,1'-diethylthia-4'-carbocyanine iodide in a concentration of about 10 mg. per liter of emulsion, curve B represents the sensitivity of the same emulsion containing 2,1'-diethyl-6'-methylthia-4'-cyanine iodide in a concentration of about 10 mg. per liter of emulsion and curve C represents the sensitivity of the same emulsion containing the two dyes each in concentration of about 10 mg. per liter of emulsion.

In Fig. 2, curve D represents the sensitivity of an ordinary bromide emulsion containing 2,1'-diethyloxa-4'-carbocyanine iodide in a concentration of about 10 mg. per liter, curve E represents the sensitivity of the same emulsion containing 3,1'-diethyl-4-phenyloxazolo-2'-cyanine iodide in concentration of about 10 mg. per liter and curve F represents the sensitivity of the same emulsion containing the two dyes each in concentration of about 10 mg. per liter.

In Fig. 3, curve G represents the sensitivity of an ordinary bromide emulsion containing 2,1'-diethylthia-4'-carbocyanine iodide in a concentration of about 10 mg. per liter, curve H represents the sensitivity of the same emulsion containing 3,1'-diethyl-4-phenyloxazolo-2'-cyanine iodide in concentration of about 10 mg. per liter and curve I represents the sensitivity of the same emulsion containing the two dyes each in concentrations of about 10 mg. per liter.

In Fig. 4, curve J represents the sensitivity of an ordinary bromide emulsion containing 2,1'-diethyl-6'-dimethylaminoselena-4'-carbocyanine iodide in a concentration of about 10 mg. per liter, curve K represents the sensitivity of the same emulsion containing 2,1'-diethylthia-2'-cyanine iodide in concentration of about 20 mg. per liter and curve L represents the sensitivity of the same emulsion containing the two dyes in concentrations of 10 mg. and 20 mg. respectively.

The spectrograms corresponding to the figures of the accompanying drawing were made in a grating spectrograph with an optical wedge having an optical density gradient of 1.0 for each horizontal line in the spectrogram. Where the spectrograms were compared as in each of the figures of the drawing, the exposures were for the same time and test plates of each group were developed together.

Still further examples showing the application of my invention could be cited, but the foregoing will be sufficient to teach those skilled in the art the manner in which my invention is carried out and the principles of sensitizing photographic emulsions with supersensitizing combinations such as described herein.

Cyanine dyes containing hydroxyalkyl groups can be prepared from cyclammonium quaternary salts prepared by reacting heterocyclic nitrogen bases with halohydrins, e. g. ethylene halohydrins and propylene halohydrins. It is advantageous to employ the bromohydrins. The heterocyclic nitrogen base and the bromohydrin are merely heated together for several hours, e. g. 25 to 30 hours or longer, at about 100° C., though 150° C. can be employed. An excess of the bromohydrin is advantageously employed. Following the reaction, the solid reaction product is advantageously converted to the iodide by treatment with potassium iodide. This can be accomplished by dissolving the crude quaternary bromide in hot water and treating the solution with a hot aqueous solution of potassium iodide (1 g. per cc. of water). Cyanine dyes containing hydroxyalkyl groups are described in the application of Leslie G. S. Brooker and Lloyd A. Smith, Serial No. 133,524, filed of even date herewith.

Acenaphthothiazolo-2'-cyanine dyes can be prepared as illustrated in the following example:

2-methyl-4,5(3,2)acenaphthothiazole (1.1 g., 1 mol.) and ethyl-p-toluenesulfonate (1 g., 1 mol.) were heated in an oil bath at 130° to 140° C. for about 65 hours. The brownish viscous mass of quaternary salt was dissolved in 20 cc. of absolute ethyl alcohol and 2-iodoquinoline ethiodide (2 g., 1 mol.) and triethylamine (1 g., 2 mol.) were added. The mixture was refluxed on a steam bath for about 30 minutes The dye separated from cooled reaction mixture and was recrystallized from methyl alcohol. The purified dye was obtained as a dull red powder melting at 277° to 279° C. with decomposition.

2-methyl-4,5(3,2)acenaphthothiazole from 3-amino-acenaphthene by acetylation thereof with acetic anhydride. 85 g. (1 mol.) of 3-aminoacenaphthene and 51.2 g. (1 mol.) of acetic anhydride in 100 cc. glacial acetic acid were heated on the steam bath for an hour. The acetylated product separated from the chilled reaction mixture. The acetylated product, 10.5 g. (1 mol), was suspended in 200 cc. of dry toluene and heated to 120° to 125° C. 5.6 g. (0.5 mol.) of phosphorous pentasulfide was added with stirring, and the mixture heated for 20 minutes longer. The toluene solution was decanted and the tarry residue was treated with an ice cold 25 cc. of 40% sodium hydroxide solution. The aqueous layer was treated with ice cold glacial acetic acid to precipitate the thioacetyl compound. The thioacetyl compound was dissolved in dilute sodium hydroxide and potassium ferricyanide solution added in excess. A light-brownish oil separated. The oil was taken up in ether, dried over anhydrous potassium carbonate and finally distilled. 2-methyl-4,5(3,2)acenaphthothiazole was obtained as a liquid boiling at 194° to 200° C. at 3 mm. of mercury and solidifying on cooling. It melted at 96° to 97° C.

What I claim as my invention and desire to secure by Letters Patent of the United States is:

1. A photographic silver halide emulsion containing a supersensitizing combination of at least one sensitizing dye selected from the group consisting of pseudocyanine and isocyanine dyes, together with at least one sensitizing dye selected from the group of 4'-carbocyanine dyes having the following formula:

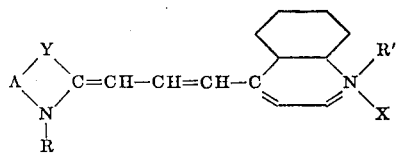

wherein A represents a divalent aryl group selected from the group consisting of phenylene and naphthylene groups, R and R' represent alkyl groups, Y represents an atom selected from the group consisting of oxygen, sulfur and selenium atoms and X represents an acid radical.

2. A photographic gelatino-silver-halide emulsion containing a supersensitizing combination of at least one sensitizing dye selected from the group consisting of pseudocyanine and isocyanine dyes, together with at least one sensitizing dye selected from the group of 4'-carbocyanine dyes having the following formula:

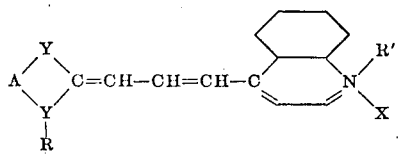

wherein A represents a divalent aryl group selected from the group consisting of phenylene and naphthlyene groups, R and R' represent alkyl groups, Y represents an atom selected from the group consisting of oxygen, sulfur and selenium atoms and X represents an acid radical.

3. A photographic gelatino-silver-halide emulsion containing a supersensitizing combination of at least one sensitizing thia-4'-carbocyanine dye, with at least one sensitizing pseudo-cyanine dye.

4. A photographic gelatino-silver-halide emulsion containing a supersensitizing combination of at least one sensitizing benzothia-4'-carbocyanine dye, with at least one sensitizing pseudocyanine dye.

5. A photographic gelatino-silver-halide emulsion containing a supersensitizing combination of at least one sensitizing selena-4'-carbocyanine dye, with at least one sensitizing pseudocyanine dye.

6. A photographic gelatino-silver-halide emulsion containing a supersensitizing combination of at least one sensitizing 2,1'-dialkylthia-4'-carbocyanine dye, with at least one sensitizing pseudocyanine dye.

7. A photographic gelatino-silver-halide emulsion containing a supersensitizing combination of at least one sensitizing 2,1'-dialkylbenzothia-4'-carbocyanine dye, with at least one sensitizing pseudocyanine dye.

8. A photographic gelatino-silver-halide emulsion containing a supersensitizing combination of at least one sensitizing 2,1'-dialkylselena-4'-carbocyanine dye, with at least one sensitizing pseudocyanine dye.

9. A photographic gelatino-silver-halide emulsion containing a supersensitizing combination of at least one sensitizing 2,1'-dialkyl-thia-2'-cyanine dye, in which the alkyl groups each contain from one to four carbon atoms, together with at least one sensitizing dye selected from the group of 4'-carbocyanine dyes having the following formula:

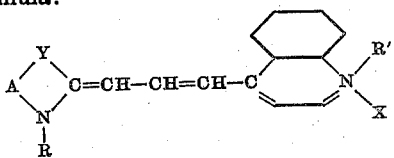

wherein A represents a divalent aryl group selected from the group consisting of phenylene and naphthylene groups, R and R' represent alkyl groups containing from one to four carbon atoms, Y represents an atom selected from the group consisting of oxygen, sulfur and selenium atoms and X represents an acid radical.

10. A photographic gelatino-silver-halide emulsion containing a supersensitizing combination of at least one sensitizing 2,1'-diethylthia-2'-cyanine halide together with at least one sensitizing dye selected from the group of 4'-carbocyanine dyes having the general formula:

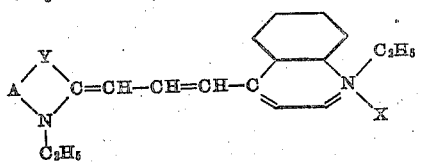

wherein A represents a divalent aryl group selected from the group consisting of phenylene and naphthylene groups, Y represents an atom selected from the group consisting of oxygen sulfur and selenium atoms and X represents a halide radical.

11. A photographic gelatino-silver-halide emulsion containing a supersensitizing combination of at least one sensitizing 1,1'-dialkyl-2,2'-cyanine dye, in which the alkyl groups each contain from one to four carbon atoms, together with at least one sensitizing dye selected from the group of 4'-carbocyanine dyes having the following formula:

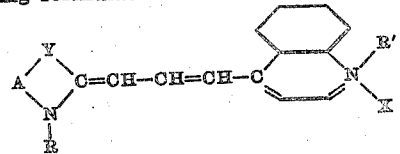

wherein A represents a divalent aryl group selected from the group consisting of phenylene and naphthylene groups, R and R' represent alkyl groups containing from one to four carbon atoms, Y represents an atom selected from the group consisting of oxygen, sulfur and selenium atoms and X represents an acid radical.

12. A photographic gelatino-silver-halide emulsion containing a supersensitizing combination of at least one sensitizing 2,2'-diethyl-2,2'-cyanine halide together with at least one sensitizing dye selected from the group of 4'-carbocyanine dyes having the general formula:

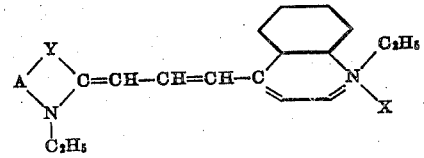

wherein A represents a divalent aryl group selected from the group consisting of phenylene and naphthylene groups, Y represents an atom selected from the group consisting of oxygen, sulfur and selenium atoms and X represents a halide radical.

13. A photographic gelatino-silver-halide emulsion containing a supersensitizing combination of at least one sensitizing 3,1'-dialkyl-4-phenyloxazolo-2'-cyanine dye in which the alkyl groups each contain from one to four carbon atoms, together with at least one sensitizing dye selected from the group of 4'-carbocyanine dyes having the general formula:

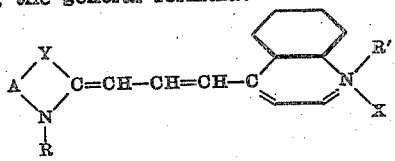

wherein A represents a divalent aryl group selected from the group consisting of phenylene and naphthylene groups, R and R' represent alkyl groups containing from one to four carbon atoms, Y represents an atom selected from the group consisting of oxygen, sulfur and selenium atoms and X represents an acid radical.

14. A photographic gelatino-silver-halide emulsion containing a supersensitizing combination of at least one sensitizing 3,1'-diethyl-4-phenyloxazolo-2'-cyanine halide together with at least one sensitizing dye selected from the group of 4'-carbocyanine dyes having the general formula:

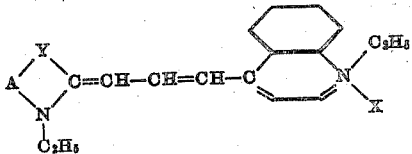

wherein A represents a divalent aryl group selected from the group consisting of phenylene and naphthylene groups, Y represents an atom selected from the group consisting of oxygen, sulfur and selenium atoms and X represents a halide radical.

CHARLES E. K. MEES.